United States Patent [19]
Ellingson

[11] Patent Number: 5,661,936
[45] Date of Patent: Sep. 2, 1997

[54] METHOD OF ATTACHING EXTRUDED CELLULAR PANELS

[76] Inventor: Robert Ellingson, 14101 Industrial Park Blvd., NE., Covington, Ga. 30209

[21] Appl. No.: 445,214

[22] Filed: May 18, 1995

[51] Int. Cl.⁶ ..................................................... E04B 1/38
[52] U.S. Cl. .................. 52/285.1; 52/288.1; 52/309.2; 52/309.7; 52/586.1; 403/295; 403/297
[58] Field of Search ................... 52/94, 285.1, 287.1, 52/288.1, 309.2, 309.7, 309.8, 309.16, 585.1, 586.1, 716.3, 656.9; 108/90; 403/231, 292, 295, 297, 298; 472/126

[56] References Cited

U.S. PATENT DOCUMENTS

| | | | |
|---|---|---|---|
| 2,482,339 | 9/1949 | Hibbard et al. | 52/209.2 X |
| 3,310,917 | 3/1967 | Simon | 52/309.2 X |
| 3,815,657 | 6/1974 | Malek et al. . | |
| 3,974,612 | 8/1976 | Karner | 52/309.2 X |
| 4,001,361 | 1/1977 | Unruh . | |
| 4,028,450 | 6/1977 | Gould . | |
| 4,099,815 | 7/1978 | Cox et al. | 403/295 X |
| 4,154,784 | 5/1979 | Ruhl . | |
| 4,157,413 | 6/1979 | Ruhl . | |
| 4,164,526 | 8/1979 | Clay et al. . | |
| 4,170,430 | 10/1979 | Mrotzek | 403/292 X |
| 4,372,901 | 2/1983 | Kim | 52/309.2 X |
| 4,453,357 | 6/1984 | Zwilgmeyer | 52/309.8 |
| 4,964,252 | 10/1990 | Guliker | 52/285.1 X |
| 5,259,687 | 11/1993 | John | 403/295 |
| 5,348,778 | 9/1994 | Knipp et al. . | |

*Primary Examiner*—Carl D. Friedman
*Assistant Examiner*—Kevin D. Wilkens
*Attorney, Agent, or Firm*—Isaf, Vaughan & Kerr

[57] ABSTRACT

A method of attaching extruded cellular plastic panels together to form structures comprises the steps of coextruding the cellular panel with a noncellular high impact section that forms a channel or keyway. Keys are received in the keyways of adjacent panels and hold the panels together to form specified shapes.

5 Claims, 3 Drawing Sheets

METHOD OF ATTACHING EXTRUDED CELLULAR PANELS

TECHNICAL FIELD

The present invention relates generally to thermoplastic coextrusions and more particularly to methods of attaching extruded cellular thermoplastic panels together to form articles having predetermined shapes.

BACKGROUND OF THE INVENTION

Today, many items that used to be made of wood are made of extruded cellular plastic materials such as general purpose or crystalline polystyrene extruded with a blowing agent. These materials are light, inexpensive, and relatively strong for their density. Examples of items that sometimes are formed of such cellular plastic panels include cornice boards, crown mold, point of purchase displays, baseboard molding, and the like. In many instances, such as in forming cornice boards and point of purchase displays, cellular panels must be attached together at their ends to form a box-shaped article. In the past, attaching extruded cellular panels together at their ends has given rise to numerous problems in the extrusion industry. Since the cellular plastic material is relatively light and porous, it cannot be attached with fasteners such as screws or nails. In addition, extruding the panels with slots or channels to accept corner keys, attaching brackets, or other fasteners has not been practical because the stress imparted by the fastener to the cellular plastic can easily break the channels under even slight stress allowing the structure to come apart.

Usually, cellular panel extruders have been left only with the option of gluing panels together at their corners with specialized glues to form box or other shaped articles. This process is time consuming, inefficient, and usually requires that the structure be assembled at the manufacturer's location, since the gluing process requires special glue, clamps, and expertise. It would be highly desirable to be able to attach extruded cellular thermoplastic panels together at their ends easily and without glue so that they could be shipped disassembled and assembled into box or other shapes on site by the end user.

Some attempts have been made to provide efficient reliable methods of attaching cellular plastic panels together at their ends. For example, U.S. Pat. No. 5,348,778 of Knipp et al. discloses sandwiching a cellular polyurethane core between rigid panels that form a shell. Flexible polyurethane edge profiles are then fixed along the panel edges between protruding ends of the shell. These profiles are formed to mate together with profiles of like panels to define a water tight joint between the panels. While this method is an improvement in attaching panels together end to end, it is not well suited to attaching panels to form box shapes. In addition, forming the sandwiched shell panels and attaching the flexible end pieces is a multi-step process that is inefficient and time consuming. Thus, the disclosure of Knipp et al, is not a viable option for attaching cellular plastic panels together to define box shapes such as those used in point of purchase displays, cornice boards, and the like.

U.S. Pat. Nos. 4,164,526 of Clay et al., U.S. Pat. No. 4,157,413 of Ruhl, U.S. Pat. No. 4,154,784 of Ruhl, U.S. Pat. No. 4,028,450 of Gould, U.S. Pat. No. 4,001,361 of Unruh, and U.S. Pat. No. 3,815,657 of Malek et al. all concern cellular plastic panels and junctions therebetween. However, none of these patents address the problem of efficient on-site attaching of such panels together at their ends to form box or other shaped articles.

Accordingly, there exists a need for an extruded cellular plastic panel with provisions for attaching the panel to like panels at the ends of the panels to form box or other shapes. Such a panel should be easily extruded, should require no retrofitting of components such as surface shells or end profiles, and should be able to be assembled by the end user quickly, easily, and reliably. It is to the provision of such an extruded cellular panel and to a method of fabricating the panel that the present invention is primarily directed.

SUMMARY OF THE INVENTION

Briefly described, the present invention, in a preferred embodiment thereof, comprises an extruded cellular plastic panel that is adapted to be joined together with like panels to form articles having box or other shapes. The assembly of the article is accomplished quickly, easily, reliably, and on-site by the end user. The invention will be described in terms of joining together such panels to form box-shaped cornice boards adapted to be placed at the tops of windows as a decorative addition. However, it should be understood that the invention is not constrained by this illustrative example and that cornice boards are only presented as one preferred embodiment of the invention. Thus, the invention should not be considered to be constrained by the particular configuration of cornice boards or any other article. Rather, the invention has far ranging applications to the joining together of extruded cellular panels to form many types of articles previously made of wood or other material.

In the illustrated embodiment, an extruded cellular panel has a decorative profile that is attractive and appropriate for use as a cornice board. The body of the panel is extruded as a cellular polystyrene or other suitable plastic material similar in composition to but usually denser than the material used in fabricating foam cups and the like. This material offers the advantages of being light, inexpensive, easily extruded, and easily formed with a wide variety of surface profiles that can simulate milled wood. The cornice board is formed by joining two end panels to the ends of a front panel and attaching a dust board across the tops of the joined panels to form a generally open box shape. The ends of the front panel and one end of each side panel is mitered so that the panels fit together neatly at their ends to form manicured corners that are visually appealing. A channel or keyway is formed on the backs of the panels during the extrusion process. The keyway is coextruded at the same time as the panel and is thus integrally bonded therewith. While the panel is formed of a relatively porous cellular plastic material extruded with a blowing agent, the keyway itself is formed of a hard, high impact material such as high-impact polystyrene (HIPS). Thus, the keyway adds strength and rigidity to the panel and, unlike the cellular material, is highly resistant to breakage. The keyway extends along the length of the front panel and the end panels and the keyways of these panels align when the panels are mated at their ends.

A pair of metal keys are used to join the end panels to the front panel. Each of the keys, which in the preferred embodiment are angle brackets, has a first leg and a second leg. The first leg is sized to be received into the channel on the back of the front panel at one end thereof. With the key inserted into the channel, its second leg extends rearwardly from the panel end and perpendicular to the panel. The keyway of the end panel can then be slid over the second leg of the key until the mitered corners of the front panel and end panel meet to form a neat mitered junction of the panels. The same procedure is performed on the opposite end of the front panel to attach the other end panel to form the open box shape of the cornice board assembly.

A dust board receiving slot is also formed during extrusion near the tops of the front and end panels. This slot is defined on its top side by a coextruded high impact polystyrene finger. Because of the composition of the finger, it tends to exhibit a slight springiness. When the front panel and end panels are connected together as described above, these upper slots of the panels align and a flat dust board, which can be plywood or masonite, can be slid into the aligned slots where it is held tightly in place by the spring action of the coextruded finger. The dust board helps define the shape of the cornice board, adds strength and rigidity, and provides a top dust barrier for the finished cornice board.

Thus, it is seen that an improved co-extruded cellular panel is provided that can be joined to like panels quickly, easily, and without glue by the end user to form useful articles such as cornice boards, displays, and the like. The assembled article is sturdy and rigid and exhibits neat mitered corners that, in many instances, are superior to glued corners. The rigid high impact keyways that are coextruded with the cellular body of the panel are sufficiently strong to hold the corner keys joining the panels together tightly and without subjecting the panels to breakage. Further, once the extruding die is set up, the panels of this invention are extruded just as easily as the all-cellular panels of the prior art. In addition, the panels of this invention are not significantly more expensive than prior art panels but yet offer the distinct advantages presented above. These and other objects, features, and advantages of the invention will become more apparent upon review of the detailed description set forth below taken in conjunction with the accompanying drawings, which are briefly described as follows.

DETAILED DESCRIPTION OF THE PREFERRED EMBODIMENT

Figure 1:
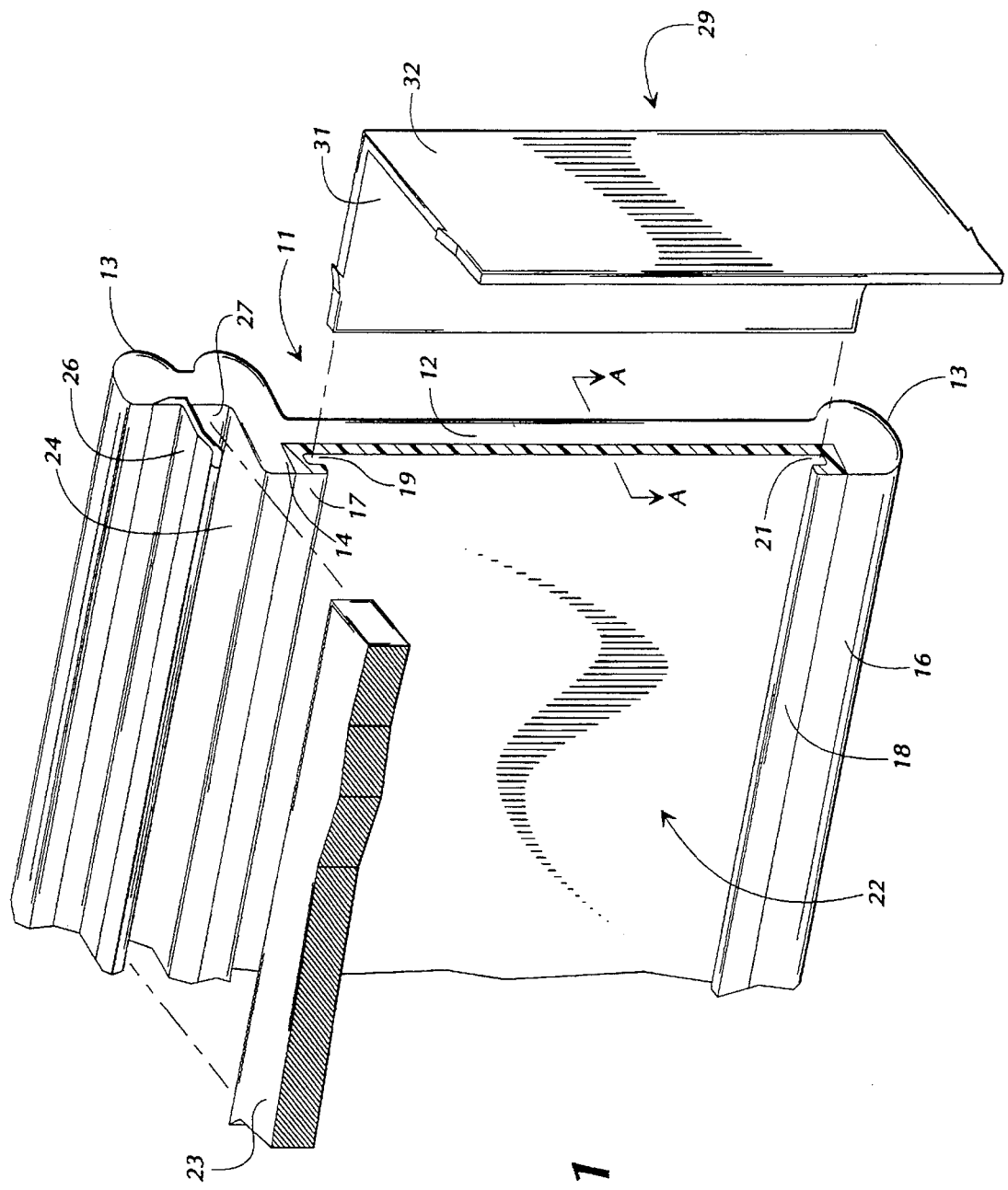
FIG. 1 is a perspective partially exploded view illustrating the present invention embodied in a window cornice board.

Referring now in more detail to the drawings, in which like numerals refer to like parts throughout the several views, FIG. 1 illustrates a coextruded cellular panel 11 that embodies principals of the present invention in a preferred form. In FIG. 1, the panel 11 is configured so that when it is joined to end panels and a dust board as described below, an open box-shaped cornice board is formed. The cornice board embodiment of this invention will be used herein as exemplary of an application of the invention. It should be understood, however, that the invention is far from limited to cornice boards and has application wherever is desired to join cellular panels to form useful articles. For example, the present invention could be applied to panels that, when joined, form a point-of-use display for showcasing articles for sale. Accordingly, the illustrated embodiment described herein should not be interpreted as a limitation of the invention, but rather only one preferred embodiment useful for illustration purposes.

The panel 11 of FIG. 1 comprises an extruded cellular plastic body 12 that is provided during the extrusion process with decorative surface configurations 13 suitable for a cornice board application. The body 12 is formed by extruding a plastic material such as general purpose polystyrene with a blowing agent such as sodium bicarbonate through an extruding die. As the material is forced through the die under heat and pressure, the blowing agent sublimes to produce gas that results in a porous cellular consistency of the body 12. Such extruding techniques are common and well known in the art and further detailed description is not required here.

The back of the panel 11 is formed with an upper lip 14 intermediate its top and bottom edges that protrudes rearwardly from the panel and extends along the length thereof. Similarly, the bottom of the panel 11 forms a lip 16 that opposes the upper lip 14 and extends substantially parallel thereto along the length of the panel 11. The lip 14 is further formed with a downwardly extending finger 17 and the lip 16 is formed with an upwardly extending finger 18 that opposes the finger 17. The upper finger 17 is spaced from the rear of the panel 11 to define an upper slot 19 that extends along the length of the panel. In like manner, the finger 18 is spaced from the back of the panel 11 and defines a lower slot 21 opposing the upper slot 19. The lower slot 21 also extends along the length of the panel 11 at the bottom portion thereof. With this configuration, it will be seen that the upper and lower slots 19 and 21 in conjunction with the back of the panel 11 define a wide rectangular channel 22 that extends longitudinally along the back side of the panel 11.

Figure 4:
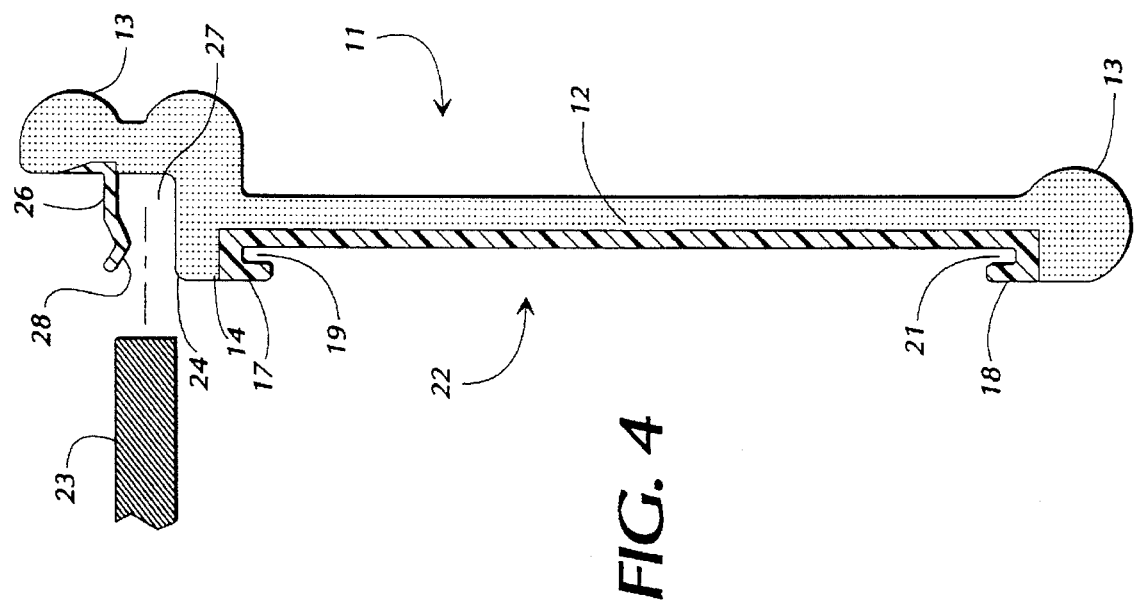
FIG. 4 is an end view of the cornice board panel of FIG. 1 showing the extruded cellular body of the panel and the coextruded high impact channel and tongues thereof.

As best illustrated in FIG. 4, the fingers 17 and 18 and the entire channel 22 are formed by coextruding along with the cellular material of the body 12 a noncellular, high strength, high impact material such as HIPS. Since this high impact material is coextruded simultaneously with the body of the panel, it becomes permanently fused with the cellular material of the body and thus forms an integral part of the completed panel. The coextrusion of the high impact channel section of the panel provides two distinct advantages. First, the resiliency of the high impact material provides strength and rigidity to the entire panel 11 so that the panel resists impact and other forces that might otherwise break or damage the panel. Second, and most importantly for the present invention, the high impact material of the channel 22 and fingers 17 and 18 defines and provides a keyway for receiving and holding securely a key that functions to join the panel 11 to like panels to form box and other shapes as described in more detail below.

Figure 2:
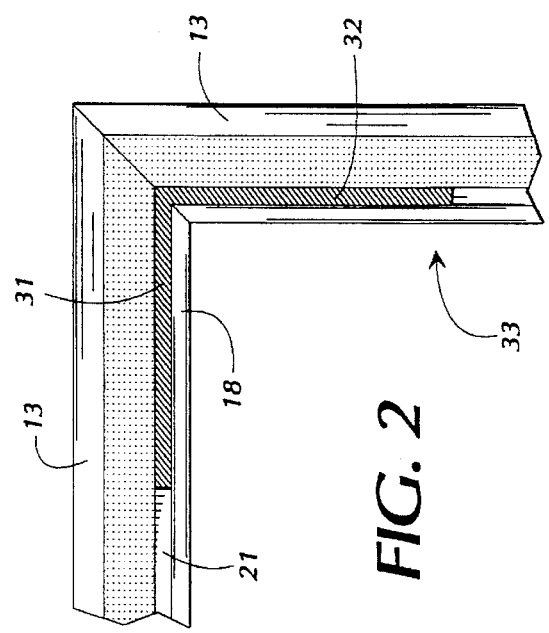
FIG. 2 is a Cross sectional view taken along line AA of FIG. 1 illustrating the mitered joined corners of the front panel and an end panel and the corner key embedded in its keyway.

A metal corner key 29 has an L-shaped cross section defining a first leg 31 and a second leg 32. The corner key 29 is sized so that its first leg 21 can be inserted into the rectangular channel 22 of the front panel 11 with the top and bottom edges of the first leg fitting snugly within the upper and lower slots 19 and 21 of the channel. When the corner key 29 is thus inserted, its second leg 32 extends rearwardly from the panel 11 at the end thereof. An end panel 33 (FIG. 2), which has the same extruded cross sectional configuration as the panel 11, can then be slid onto the second leg 32 of the corner key 29 with the channel of the end panel receiving the leg until the mitered ends of the front panel 11 and the end panel 33 meet as illustrated. Thus, when the front panel 11 and end panel 33 are joined together as just described, the legs 31 and 32 of the corner key fit snugly into the respective channels of the front and end panels thus holding the panels firmly together. The high impact nature and strength of the coextruded channel 32 provides ample holding capability for the corner key 29 and the channel does not tend to deform or break under undue force or tension.

Figure 3:
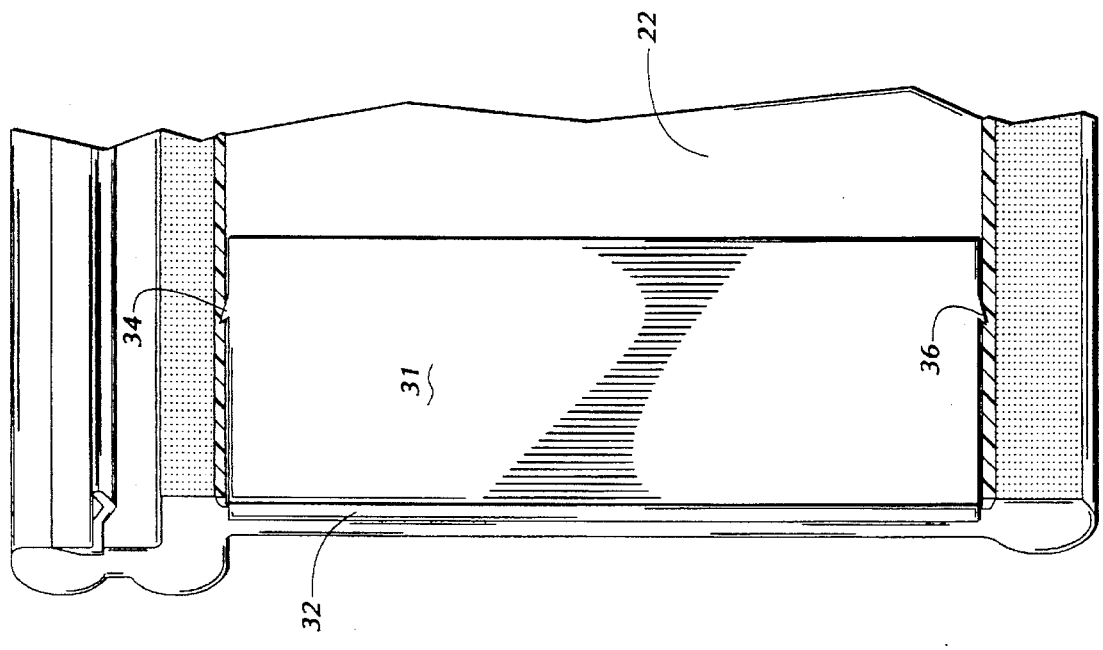
FIG. 3 is a cut away partially sectioned view from the rear side of the panel of FIG. 1 showing the corner key embedded within the coextruded hard plastic channel.

To enhance further the holding ability of the corner key, the key can be provided, as illustrated in FIG. 3, with barbs 34 and 36, which imbed themselves in the high impact plastic material of the channel 22 thus preventing the corner key from wiggling or otherwise sliding out of the channel once it is inserted. With this configuration the corner key 29 can easily be inserted into the channel 22 for assembling the article but, once inserted, cannot be removed without destroying the article. Accordingly, the finished assembled article is strong and does not tend to work loose over time.

Referring again to FIG. 1, in forming a box shaped article such as a cornice board, it is desirable to provide a dust board 23 that spans and defines the top of the finished cornice board. The dust board 23 is a simple flat board and can be made from plywood, masonite, or other suitable material. In the prior art, as mentioned above, cornice boards of the type illustrated in FIG. 1 generally were assembled by the manufacturer and shipped to the end user in their assembled completed form. One reason for this requirement was that there was no simple way provided for the end user to assemble the product once he received it. The assembly process usually required gluing and clamping, which was beyond the expertise and abilities of the end user. Another reason for assembly by the manufacturer was the lack of a simple way of attaching the dust board 23 to the top of the front and end panels. The dust board 23 usually was attached with a pneumatic staple gun or similar tool, which drove staples through the dust board and into the cellular material of the body 11. Clearly, such a means for attaching the dust board is far beyond the capabilities of an end user.

In the present invention, a simple, quick and easy method of attaching the dust board 23 is provided. For this purpose, the cellular body 12 of the panel 11 is extruded with a cellular lip 24 that extends along the length of the panel 11 adjacent its top edge. Coextruded with the cellular body 11 is a tongue 26 that overlies the lip 24 and defines therewith a slot 27 that also extends along the length of the panel 11. As with the rectangular panel 22, the tongue 26 is formed from a high impact noncellular plastic material such as HIPS and, because it is coextruded with the body 12, is an integral part of the panel 11. Further, because of the physical characteristics of HIPS, the tongue 26 exhibits a resiliency and a tendency to spring slightly in the vertical direction in FIG. 1. Further, as illustrated best in FIG. 4, the end of the tongue 26 is formed to define a tooth 28 that extends downwardly toward the lip 24.

It will thus be seen that when the front and end panels are joined, their slots 27 align to define a coextensive race that extends around the inner perimeter of the joined panels. A dust board 23 can then be slid into place within the race as indicated in FIGS. 1 and 4. As the edge of the dust board 23 moves into the race, the force of the dust board springs the tongues 26 upwardly to allow the board 23 to move into the slots of the race. When the dust board 23 is fully inserted into the race, the springiness of the tongues 26 bears downwardly against the dust board 23 around its perimeter holding it firmly against the top of the upper lip 24. It has been found that the pressure provided by the tongue 26 is more than sufficient to hold the dust board firmly in place at the top of the panel 11.

In use, the various panels of an article such as a cornice board are extruded with the cellular portions and high impact portions formed as illustrated and described. The appropriate ends of the panels can then be mitered and the panels, along with cornerkeys 29 and a dust board 23, can be shipped in a small flat package. When received by the end user, the article is quickly assembled by inserting the first legs 31 of the corner keys in the channel of the front panel 11, sliding the end panels onto the second legs 32 of the corner keys, and sliding the dust board 23 in place within the race formed by the slots 27. A box shaped cornice board with a dust board 23 is thus easily and quickly assembled.

Figure 5:
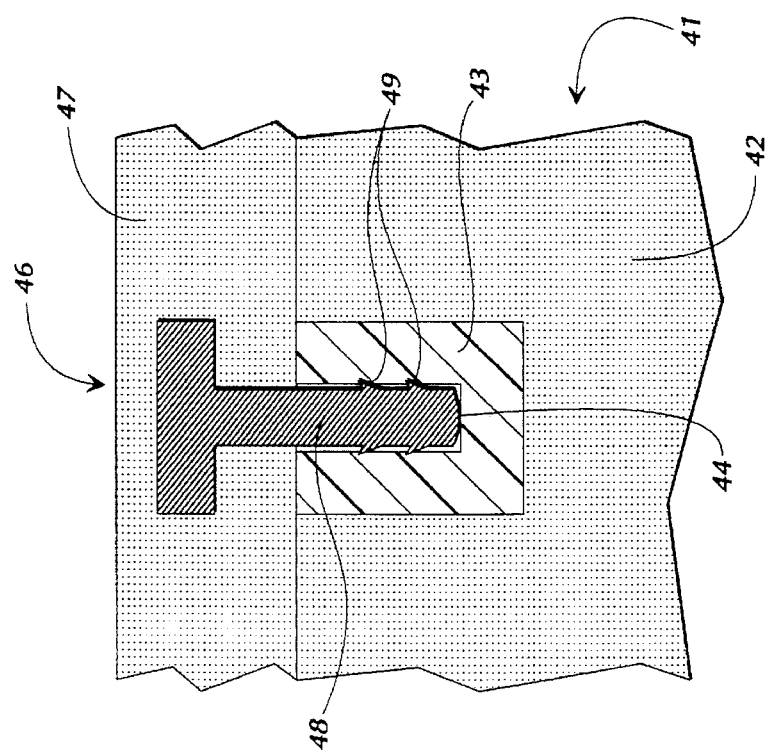
FIG. 5 is a cross sectional view illustrating an alternate embodiment of the present invention for attaching panels together.

FIG. 5 is a cross-Sectional view illustrating an alternate embodiment of the present invention. The embodiment of FIG. 5 provides a method of attaching two cellular panels together. The first panel 41 is formed with an extruded cellular body 42 having a high impact noncellular plastic insert 43 coextruded and formed integrally therewith. The insert 43 defines a channel 44. A second panel 46 has a cellular body 47 with a noncellular high impact plastic tongue 48 coextruded therewith and extending outwardly therefrom. The tongue 48 is sized to be received in the channel 44 and preferably is provided with one or more barbs 49 for holding the tongue in place within the channel. In use, the second panel 46 is pressed onto the first panel 42 with the tongue 48 extending into the channel 44. When the two panels are firmly pressed together, the barbs 49 grasp the walls of the channel 44 to hold the two panels in place. In this way, the relatively less dense cellular panels 42 and 46 can be securely attached together to form a box or other shapes.

The invention has been described herein in terms of preferred embodiments and methodologies. It will be understood by those skilled in this art, however, that a wide variety of variations, modifications, and improvements might well be made to the illustrated embodiments within the scope of the invention. For example, while the preferred embodiment of FIGS. 1 through 4 has been illustrated to be a cornice board, clearly any type of structure requiring that panels be connected together to form a shape is anticipated by this invention. Also, where specific materials such as GPPS and HIPS have been specified in describing the preferred embodiments, other materials suited to the particular needs of the article might also be employed. In addition, while the fingers 17 in the preferred embodiment have been illustrated as being formed of solid, non-cellular plastics material, they may, if desired, be formed with a cellular core having a cap of co-extruded non-cellular material and such an embodiment is within the scope of this invention. These and other additions, deletions, and modifications might well be made to be embodiments illustrated herein without departing from the spirit and scope of the invention as set forth in the claims.

I claim:

1. An extruded plastic panel assembly comprising:

a first panel body formed of extruded cellular plastic material;

a first key receiving slot coextruded integrally with said first panel body with said first key receiving slot being formed at least partially of a relatively more dense non-cellular plastic material;

a second panel body formed of extruded cellular plastic material;

a second key receiving slot coextruded integrally with said second panel body with said second key receiving slot being formed at least partially of a relatively more dense non-cellular plastic material;

a key having first and second ends;

said first and second key receiving slots being sized and configured to receive and firmly grasp said first and second ends respectively of said key to join said first and second panels together forming an article of predetermined configuration.

2. A method of fabricating a cellular plastic panel assembly comprising the steps of providing a key having legs, coextruding a first panel to have a relatively less dense cellular plastic body and a relatively more dense non-cellular plastic keyway being sized and configured to receive one leg of the key; coextruding a second panel to have a relatively less dense cellular plastic body and a relatively more dense non-cellular plastic keyway being sized and configured to receive another leg of the key; inserting one leg of the key into the keyway of the first panel; and inserting another leg of the key into the keyway of the second panel to join the panels together forming the panel assembly.

3. A generally box-shaped assembly formed of extruded cellular plastic panels joined at their ends, said box-shaped assembly comprising:

a front panel having a substantially cellular extruded plastic body with a front side, a back side, a top, a bottom, a first end and a second end;

a keyway formed on said back side of said front panel with said keyway being composed of a relatively more dense non-cellular plastic material coextruded with and integral to said cellular extruded plastic body;

at least one end panel having a substantially cellular extruded plastic body with a front side, a back side, a top, a bottom and a first end;

a keyway formed on said back side of said end panel with said keyway being composed of a relatively more dense non-cellular plastic material coextruded with and integral to said cellular extruded plastic body of said end panel;

said end panel being mated at said first end to an end of said front panel to form two sides of the box-shaped structure;

a key having a first leg firmly secured within said keyway of said front panel and a second leg firmly secured within said keyway of said end panel, said key holding said end panel securely to said front panel.

4. The assembly of claim 3 and further comprising a slot formed along the back of said front panel adjacent the top side thereof and a slot formed along the back side of said end panel adjacent the top side thereof, said slots being aligned to be coextensive with one another with each slot having at least one side comprising a tongue composed of a coextruded high impact plastic material, said slot for receiving the edges of a dust board with said tongue bearing firmly against the dust board edges to hold it securely in place within the slot.

5. The assembly of claim 4 and wherein said tongue is formed with a tooth that engages and bears against the dust board when the dust board is inserted within the slot.

* * * * *